(12) United States Patent
Clauss

(10) Patent No.: US 6,874,304 B2
(45) Date of Patent: Apr. 5, 2005

(54) DEVICE FOR DETECTING THE PRESENCE OF A CROP FLOW IN A HARVESTING MACHINE

(75) Inventor: Steffen Clauss, Rieschweiler-Mühlbach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/389,210

(22) Filed: Mar. 12, 2003

(65) Prior Publication Data

US 2003/0172636 A1 Sep. 18, 2003

(30) Foreign Application Priority Data

Mar. 16, 2002 (DE) .......................................... 102 11 800

(51) Int. Cl.[7] .............................................. A01D 75/28
(52) U.S. Cl. ...................................... 56/10.2 R; 460/1
(58) Field of Search ........................ 56/10.2 R, 16.4 R, 56/16.4 A, 16.4 B; 460/1, 6

(56) References Cited

U.S. PATENT DOCUMENTS

| | | | | | |
|---|---|---|---|---|---|
| 3,610,252 | A | * | 10/1971 | De Coene et al. .............. | 460/1 |
| 4,296,409 | A | * | 10/1981 | Whitaker et al. ............ | 340/684 |
| 4,765,190 | A | * | 8/1988 | Strubbe .................... | 73/861.72 |
| 4,951,031 | A | * | 8/1990 | Strubbe ....................... | 340/684 |
| 4,961,304 | A | * | 10/1990 | Ovsborn et al. .......... | 56/10.2 R |
| 5,282,389 | A | * | 2/1994 | Faivre et al. ............. | 73/861.73 |
| 5,318,475 | A | * | 6/1994 | Schrock et al. ................. | 460/1 |
| 5,343,761 | A | * | 9/1994 | Myers ...................... | 73/861.73 |
| 5,524,424 | A | * | 6/1996 | Halgrimson et al. ..... | 56/10.2 D |
| 5,736,652 | A | * | 4/1998 | Strubbe ................... | 73/861.73 |
| 5,795,221 | A | * | 8/1998 | Diekhans ........................ | 460/6 |
| 5,995,894 | A | * | 11/1999 | Wendte ........................ | 701/50 |
| 6,146,268 | A | * | 11/2000 | Behnke et al. ................. | 460/4 |
| 6,401,549 | B1 | * | 6/2002 | Ohlemeyer .............. | 73/861.73 |
| 6,442,916 | B1 | * | 9/2002 | Pope ........................ | 56/10.2 R |
| 6,460,008 | B1 | * | 10/2002 | Hardt ......................... | 702/156 |
| 6,616,527 | B2 | * | 9/2003 | Shinners et al. ............... | 460/6 |

FOREIGN PATENT DOCUMENTS

| | | |
|---|---|---|
| DE | 40 35 471 | 5/1991 |
| DE | 199 03 471 C | 6/2000 |
| EP | 1 208 734 A1 | 5/2002 |

* cited by examiner

*Primary Examiner*—Thomas B. Wiil
*Assistant Examiner*—Alicia Torres

(57) ABSTRACT

Disclosed is a sensor for detecting the presence of a crop flow in a harvesting machine. The sensor is designed to emit an output signal containing information on whether crop material is passing through the harvesting machine or not. It is suggested that the sensor be designed to detect vibrations produced during the processing and/or transporting of the crop flow in the harvesting machine. Such a sensor is especially suitable for use with arrangements for calculating the area from which crop is being harvested and for mapping yields.

5 Claims, 2 Drawing Sheets

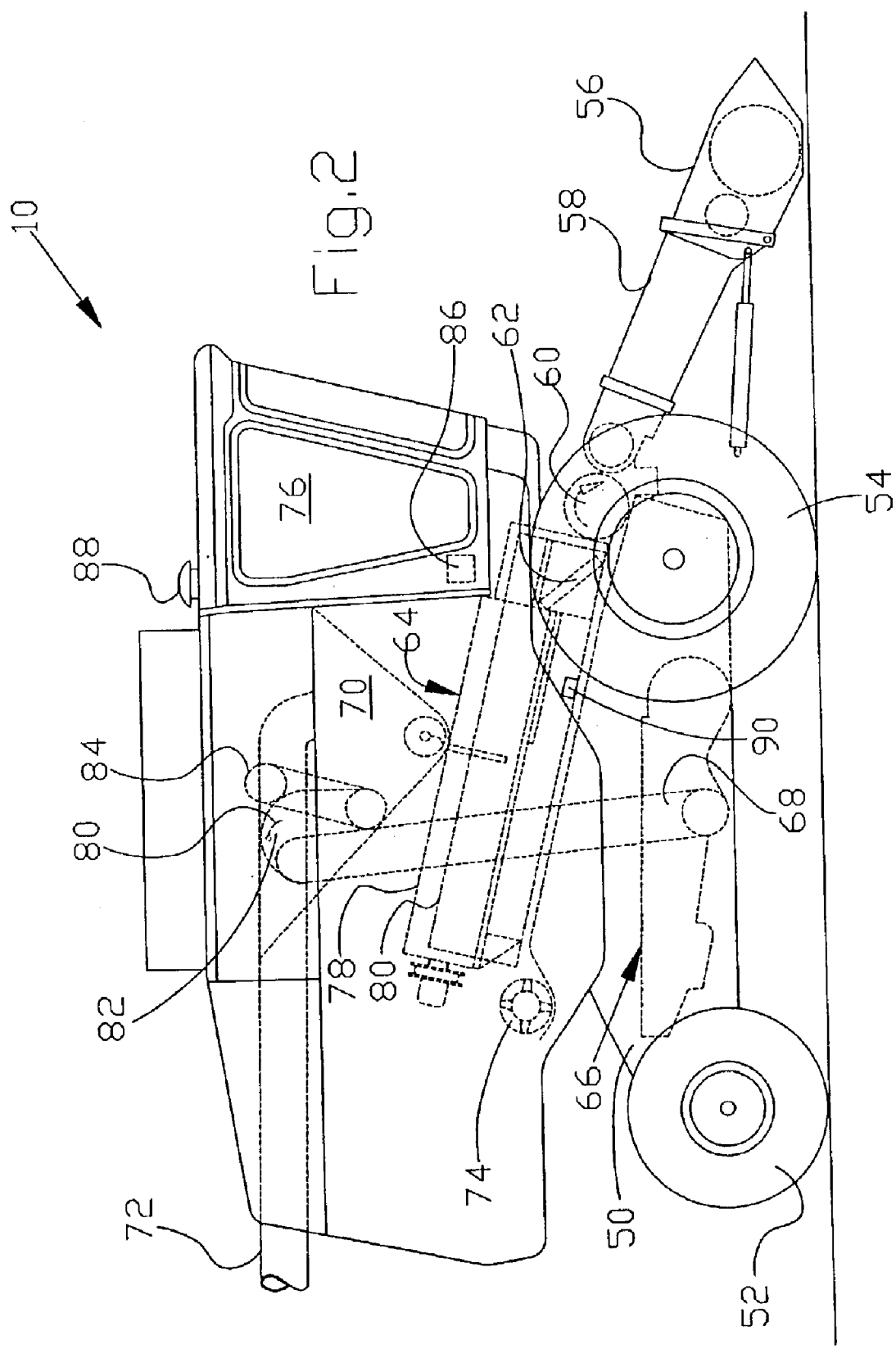

US 6,874,304 B2

DEVICE FOR DETECTING THE PRESENCE OF A CROP FLOW IN A HARVESTING MACHINE

FIELD OF THE INVENTION

The invention relates to a device for detecting the presence of a crop flow in a harvesting machine with a sensor designed to emit an output signal containing information on whether crop material is passing through the harvesting machine or not.

BACKGROUND OF THE INVENTION

Sensors, for measuring the throughput of crops and based on different physical principles, are used in harvesting machines for indicating the yield and/or for yield mapping. The sensors measure the crop throughput within certain error tolerances. In many systems, throughputs below a certain threshold value can no longer be precisely measured. It is also conceivable, due to the error tolerances of the sensors, that throughputs are measured even though no crop is transported through the harvesting machine.

Harvesting machines are, as a rule, also provided with so-called hectare or acre counters or meters used to measure the harvested area. They continue to count a measuring value representing the worked surface if a number of conditions have been met, such as positive, i.e., forward, travel speed, front attachment in harvesting position, and if the crop processing and/or transport devices are in an operating mode. Since the presence of crop material is not checked, the harvested area continues to be counted even if no flow of crop material is actually present. Even given a logical linkage to the signals of the sensors for measuring the crop throughput, the corresponding information is not always correct, and results in incorrect area values.

The suggestion was therefore made to combine the sensor for measuring crop throughput with a sensor for detecting the presence of crop flow. To this end, U.S. Pat. No. 6,401,549, which corresponds to DE 199 03471 C uses a light barrier in the discharge device of a field chopper. A measured value different from zero for the crop flow is emitted only if it detects a crop flow. However, the light barrier requires an additional structural component whose parts coming in contact with the crop flow wear down and can become contaminated after being used for a rather long time.

Acoustic sensors are used in combines to detect lost grain. They detect oscillations caused by lost grain falling onto impact plates or rods.

SUMMARY OF THE INVENTION

The invention has the basic problem of making available an improved device for the detection of the presence of a crop flow.

An object of the invention is to provide a harvesting machine incorporating a crop flow detecting device which detects vibrations produced during the processing and/or transporting of the crop flow in the harvesting machine.

The invention suggests detecting the presence or the absence of the crop flow in the harvesting machine acoustically. If a crop flow is present, it causes noises during the processing and/or during the transport in the harvesting machine. The sensor detects these noises, that is, mechanical or acoustic oscillations. The desired information about the presence of the crop flow is derived from the output signal of the sensor.

In this manner, the desired information is obtained by a sensor that can be arranged outside of the crop flow, is not subject to any wear, and is not contaminated during operation.

Various embodiments can be considered as the sensor. It would be conceivable to use a microphone that is advantageously arranged in the vicinity of a location at which the crop flow causes the highest possible noise level in order to allow the best possible differentiation from background noises. The microphone can detect the vibrations purely by air sound, i.e., acoustically, or by body sound, i.e., mechanically. It can, in particular, be a knocking sensor, like the one known in devices for adjusting the countercutting knife edge or shearbar in field choppers. It is also conceivable to use a sensor that detects the vibrations optically, e.g., with a laser beam that strikes elements that vibrate upon the presence of a crop flow. The reflected beam, whose direction is influenced by the vibrating elements, is detected by a position-sensitive detector.

The output signal of the sensor can also be used to control other elements of the harvesting machine. If, for example, a knocking sensor arranged on the countercutting knife edge of a chopper drum is used, its output signal can be used to adjust the position of the countercutting knife edge as well as to verify a crop flow. In another embodiment, the sensor is arranged on the threshing concave of a combine. Its output signal can be used to adjust the slot of the threshing concave.

The sensor, in accordance with the invention, can be used in an area-detecting device, a so-called hectare counter or acre meter, to differentiate the areas on which the actual harvesting is taking place from the remaining areas. The area is only counted if a crop flow is actually present.

The sensor can also be used in yield display devices and/or yield mapping devices to only consider values referring to the amount of crop taken up when the sensor furnishes a signal indicating that a crop flow is actually present. Otherwise, the amount of yield is detected as zero. Such yield mapping devices generally operate in a geo-referenced manner.

BRIEF DESCRIPTION OF THE DRAWINGS

The drawings show two exemplary embodiments of the invention that are described in detail in the following.

FIG. 2 is a somewhat schematic, right side elevational view of a combine.

DESCRIPTION OF THE PREFERRED EMBODIMENT

Figure 1:
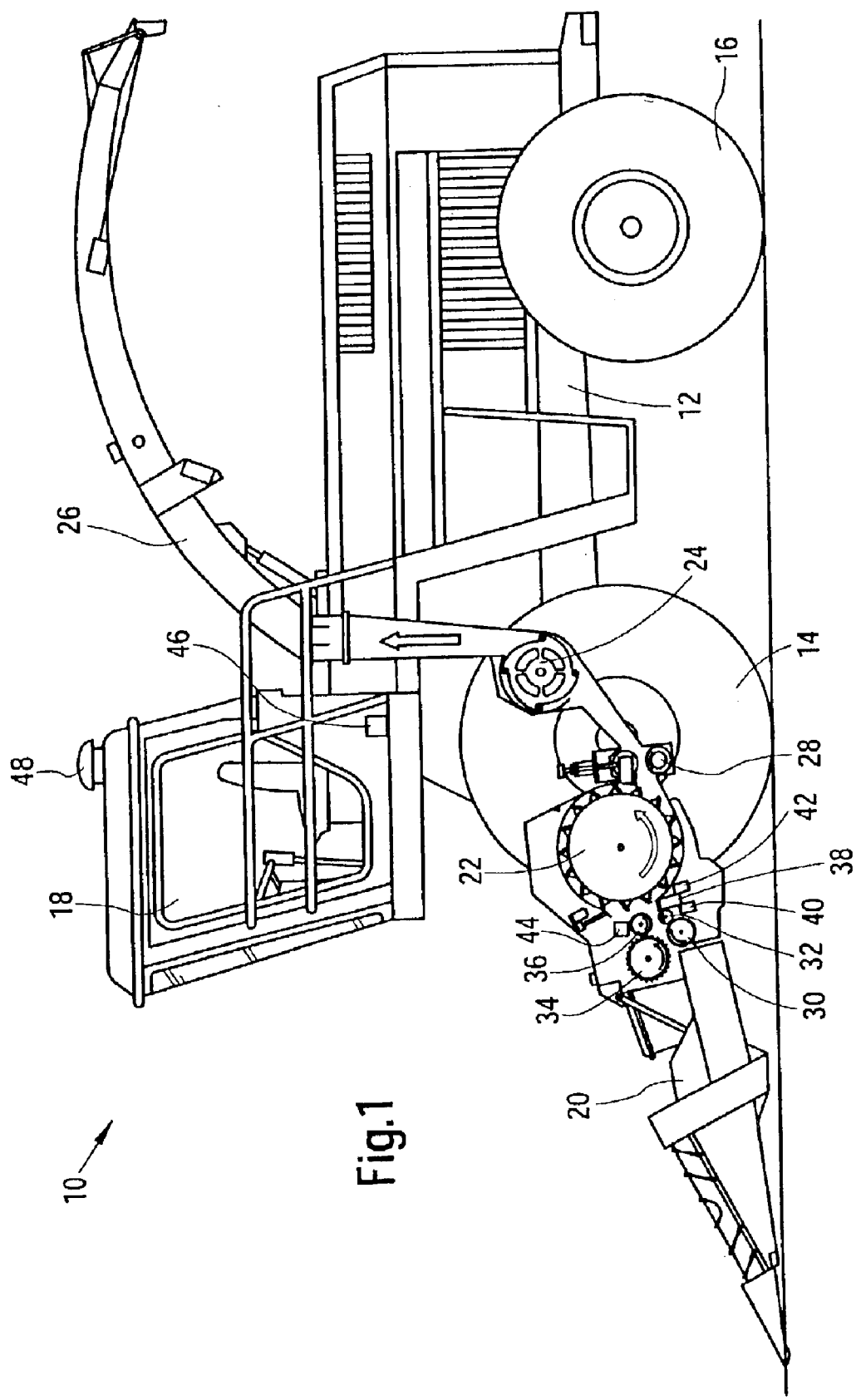
FIG. 1 is a somewhat schematic, left side elevational view of a field chopper.

Referring now to FIG. 1, there is shown a harvesting machine 10 in the form of a self-propelled field chopper including a main frame 12 carried by front and rear pairs of wheels 14 and 16, respectively. The harvesting machine 10 is operated from an operator cab 18 located on a forward part of the frame 12 and from which one can view a crop pickup device 20. Crop material, e.g., corn, grass or the like taken up from the ground by the crop pickup device 20, is fed to a chopper drum 22, that chops the crop into small pieces and impels the crop to a transport device or blower 24. The crop leaves the harvesting machine 10 to a trailer moving alongside via rotatable discharge spout 26. Comminuting device or kernel processor 28 is located between the chopper drum 22 and the transport device 24 and tangentially feeds the crop to be transported to transport device 24.

The crop is transported between crop pickup device 20 and the chopper drum 22 through lower compression rollers 30 and 32 and upper compression rollers 34 and 36. The knives distributed over the circumference of chopper drum 22 cooperate with countercutting knife edge or shearbar 38 in order to chop the crop. Countercutting knife edge 38 is provided with adjustment device 40 that is set to move countercutting knife edge 38 in a horizontal direction toward, or away from, the chopper drum 22. It serves to adjust the cutting slot. A knocking sensor 42 is arranged on the countercutting knife edge 28. It detects the noises caused by the knives of chopper drum 22 when countercutting knife edge 38 comes closer to chopper drum 22. The output signals of the knocking sensor 42 are used in a known manner to adjust the position of countercutting knife edge 38.

A throughput sensor 44 is associated with the upper rear compression roller 36. The compression roller 36 can be moved up by the crop against the force of a spring. Throughput sensor 44 comprises a potentiometer that is adjusted upward by compression roller 36 during its movement. Thus, the throughput sensor 44 produces information about the particular throughput. The throughput sensor 44 is connected to a computer 46 arranged in the operator cab 18, of which the computer is also connected to a position sensor 48, that is shown in the form of a GPS antenna as an exemplary embodiment.

The computer 46 detects the signals of the throughput sensor 44 and of the position sensor 48 during the harvesting and makes a geo-referenced yield map and also produces a yield display for the operator. An advance or travel speed signal can also be taken into consideration, thereby, that is produced by a known sensor. The yield signal can also be used for automatic control of the advance speed. Since the separation between upper rear compression roller 36 and rear back compression roller 32 does not differ substantially or not at all, given small crop throughputs, from the separation that they assume when there is no throughput at all present, throughput sensor 44 would actually display non-existent measured values in the case of low or lacking throughputs, which however, would be displayed and mapped.

In order to improve the accuracy of the yield display and yield mapping, the computer 46 is connected to the knocking sensor 42. Its analog output signals are digitized in the computer 46 or by a separate transducer. Knocking sensor 42 supplies an output signal whose amplitude and/or frequency contain information about whether crop material is being processed or not at the time, since the chopping of the crop material causes mechanical oscillations in the countercutting knife edge 38 that are picked up by the knocking sensor 42. The measured values supplied by throughput sensor 44 are only mapped as differing from zero if the output signal of knocking sensor 42 indicates processed crop material. This avoids the above-described mapping errors.

Moreover, computer 46 detects the size of the area harvested by the harvesting machine 10. The signal of the position sensor 48 is used for this. In an analogous manner, the computer 46 detects an area that has been traveled over as having been harvested only when the output signal of the knocking sensor 42 indicates that crop material is being processed. Signals indicating the operating state of the crop pickup device 20 and of the chopper drum 22 can also be considered in the detection of areas.

FIG. 2 illustrates a second embodiment of the invention that shows a harvesting machine 10 in the form of a self-propelled combine. It comprises a main frame 50 supported in a movable fashion by a wheel arrangement, comprising rear, steerable wheels 52 and front, driven wheels 54.

A vertically adjustable front harvesting attachment 56 with a mowing beam is used to cut off standing crop material and supply cut material to an oblique conveyor 58. The oblique conveyor 58 is pivotably connected to the main frame 50 and comprises a conveying device for feeding the harvested material to a guide drum 60. The guide drum 60 conducts the material upward through the inlet transition section 62 to a rotatable threshing and separating device 64. Other orientations and types of threshing devices and other types of front harvesting attachments 56, such as transversally arranged frames carrying individual units in rows, could also be used.

The rotating threshing and separating device 64 threshes and separates the harvested crop. The grain and chaff fall through grates on the bottom of the threshing and separating device 64 into a cleaning system 66. The cleaning system 66 removes the chaff and conveys the clean grain to an elevator 68. The elevator 68 for clean grain, deposits the clean grain in a grain tank 70. The clean grain in the grain tank 70 can be unloaded by an unloading auger 72 onto a truck or a trailer.

Threshed, grain-free straw is fed from threshing and separating device 64 through an outlet to an ejection drum 74. The ejection drum 74 ejects the straw at the back of the combine 10. Note that the ejection drum 74 could also supply the material freed of grain directly to a straw chopper. The operation of the harvesting machine 10 is controlled from an operator cab 76.

The rotatable threshing and separating device 64 comprises a cylindrical rotor housing 78 and a hydraulically driven rotor 80 arranged in the rotor housing 78. The front part of rotor 80 and rotor housing 78 define a loading section. A threshing section, separating section, and outlet section are downstream from the loading section. The rotor 80 is provided in the loading section with a conical rotor drum comprising helical loading elements for engaging into material that it receives from the guide drum 60 and from the inlet transition area 62. The threshing section is located immediately downstream from the loading section. In the threshing section, rotor 80 comprises a cylindrical rotor drum provided with a number of threshing elements in order to thresh the material received from the loading section. The separating section is located downstream from the threshing section, in which separating section, the grain still caught in the threshed material is set free and falls through a bottom grate in the rotor housing 78 into the cleaning system 66. The separating section merges into an outlet section in which the straw freed from the grain is ejected from the threshing and separating device.

The throughput sensor 81 is in the form of a known impact plate sensor and is arranged at the outlet of elevator 68 in the transition housing 82. The grain coming out of the elevator 68 is transported on the bottom of the transition housing 82 by the auger 84 into the grain 70. A computer 86 is electrically connected to the throughput sensor 81 and a position sensor 88, shown here as a GPS antenna. The computer 86 can be operated during the harvesting operation, and by using measured values of the throughput sensor 81, to prepare a geo-referenced yield map and to display the instantaneous yield to the operator. Since the measured values of the throughput sensor 81 have a fair number of errors in the instance of relatively low yields, the computer 86 is connected to another sensor 90 designed to detect whether a crop flow is present at all. The measured values of throughput sensor 81 are only viewed as differing from zero if the sensor 90 indicates the presence of crop flow. Computer 86 can, as in the first embodiment, detect the harvested area, during which the signals of the sensor 90 are considered in the described manner.

The sensor 90 is arranged on the threshing section of the rotor housing 78 of the threshing and separating device 64. The sensor 90 is an acoustic sensor and detects mechanical vibrations generated by the crop during threshing. The signals of sensor 90 are digitized and supplied to the computer 86. Using the frequency and/or amplitude of the signals of sensor 90, computer 86 recognizes whether crop is being processed or not. The signals of sensor 90 can also be used to automatically adjust the separation between the rotor 80 and the threshing concave.

It remains to be pointed out that the sensor 90 can also be associated with tangentially loaded threshing drums of combines with straw shakers or of combines with separating rotors arranged after a tangential threshing drum. In each instance, this sensor detects the noises caused during the threshing of crop material.

Sensor 90 could also be arranged in the oblique conveyor 58 and detect noises caused by the crop when striking edges or when passing any surface. Such sensors are currently being used for detecting stone-like objects (U.S. Pat. No. 4,343,137 A).

Having described the preferred embodiment, it will become apparent that various modifications can be made without departing from the scope of the invention as defined in the accompanying claims.

What is claimed is:

1. In a harvesting machine including crop transporting and processing components for causing a stream of crop to flow through the machine, a crop throughput measuring device including a first sensor associated with said crop transporting and processing components for emitting a first output signal coupled to a control unit for use in calculating the crop throughput and a second sensor located at least adjacent said stream of crop for detecting the presence of said crop stream and for emitting a second output signal containing information on whether or not crop material is flowing through said harvesting machine, with said second output signal being coupled to said control unit for use in calculating the crop throughout such that the latter is computed to be zero when no crop flow is sensed by said second sensor, the improvement comprising: said second sensor being designed for detecting vibrations produced during the processing and/or transporting of the crop flow in the harvesting machine; and said second sensor further being used to sense a spacing between adjacent ones of said crop transporting and processing components with said second output signal being used also to establish information used in adjusting said spacing between said adjacent ones of said crop transporting and processing components.

2. The harvesting machine, as defined in claim 1, wherein said second sensor is an acoustic sensor.

3. The harvesting machine, as defined in claim 1, wherein said processing components of said harvesting machine includes a countercutting knife; and said second sensor being a knocking sensor arranged on the countercutting knife.

4. The harvesting machine, as defined in claim 1, wherein said harvesting machine includes a threshing and separating device; and said second sensor being arranged on said threshing and separating device.

5. In a harvesting machine including crop transporting and processing components for causing a flow of crop through the machine, and a crop area calculating arrangement mounted on said machine for determining an area of crop being harvested, the improvement comprising: a sensor for detecting a presence of crop flow within said machine and creating a signal representative of the presence or absence of crop flow; and said sensor being coupled to said crop area calculating arrangement such that the crop area calculation will result in an increase in crop area only if said signal indicates the presence of crop flow within said machine.

* * * * *